United States Patent [19]
Keskitalo et al.

[11] Patent Number: 5,887,021
[45] Date of Patent: Mar. 23, 1999

[54] BASE STATION RECEIVER AND A METHOD FOR RECEIVING A SIGNAL

[75] Inventors: Ilkka Keskitalo, Oulu; Petri Hokkanen, Palokka, both of Finland

[73] Assignee: Nokia Telecommunications OY, Espoo, Finland

[21] Appl. No.: 717,724

[22] Filed: Sep. 23, 1996

[51] Int. Cl.[6] .................................................. H04B 15/00
[52] U.S. Cl. .......................................... 375/200; 455/33.1
[58] Field of Search ..................................... 370/331, 332, 370/335; 375/200, 208, 267, 347; 455/101, 132, 277.1, 526, 33.1

[56] References Cited

U.S. PATENT DOCUMENTS

| | | | |
|---|---|---|---|
| 5,267,261 | 11/1993 | Blakeney, II et al. | 375/200 |
| 5,437,055 | 7/1995 | Wheatly, III | 455/33.3 |
| 5,548,812 | 8/1996 | Padonani et al. | 455/33.2 |
| 5,625,876 | 4/1997 | Gilhousen et al. | 455/33.3 |

OTHER PUBLICATIONS

Padovani, R., "Reverse Link Performance of IS–95 Based Cellular Systems", *IEEE*PersonalCommunications, Third Quarter, 1994, pp. 28–34.

*Primary Examiner*—Stephen Chin
*Assistant Examiner*—Joseph Roundtree
*Attorney, Agent, or Firm*—Pillsbury Madison & Sutro LLP

[57] ABSTRACT

A base station receiver and a method for receiving a signal in a base station receiver the service area of which is divided into sectors, the signal including multipath propagated signal components. To provide a preferred base station structure, the signal components received in each sector are converted in the method to an intermediate frequency and to digital form, the digitalized signal components are supplied by use of a sector-specific multiplexed bus to a plural number of correlation and spectrum assembling elements, in which each signal component is demodulated and assembled to narrowband form, and the demodulated signal components are supplied by connecting elements to a plural number of receiver-specific combining elements, in which the signals obtained from the different sectors are combined and detected.

11 Claims, 4 Drawing Sheets

BASE STATION RECEIVER AND A METHOD FOR RECEIVING A SIGNAL

FIELD OF THE INVENTION

The invention relates to spread spectrum data transmission and especially to a base station receiver and to a reception method by which a signal that has propagated over multiple paths is received and combined.

BACKGROUND ART

The present invention is especially well applicable for use in a cellular radio system that utilizes Code Division Multiple Access, CDMA. CDMA is a multiple access method based on spread spectrum technology, and it has recently been put to use in cellular radio systems, where FDMA and TDMA have been used before. An example for a known CDMA system is a broadband cellular radio standard EIA/TIA IS-95.

In a typical mobile phone environment, the signals between a base station and a mobile station usually propagate over multiple paths between a transmitter and a receiver. This multipath propagation is mainly caused by reflections of the signal from the surrounding surfaces. The multipath propagated signals arrive at the receiver at different times due to respective different propagation delays. In CDMA, multipath propagation can be used in the reception of signals in the same way as diversity. The autocorrelation characteristics of the spreading codes used in the transmissions make it possible to distinguish the different delay components from one another. For a CDMA receiver there is generally used a multibranch rake receiver in which each branch is synchronized with a signal component that has propagated over a different path. A digital reception unit comprises a plural number of rake branches, and each branch is an independent receiver element with the task of assembling and demodulating a received signal component. In a CDMA receiver, the signals of the different elements of a digital receiver unit are combined advantageously to obtain a high quality signal.

In CDMA systems, it is also possible to apply so called soft handoff, in which a mobile station may simultaneously communicate with a plurality of base stations utilizing macro diversity. The quality of the mobile station connection during the handoff is thus maintained high and the user does not notice a break in the connection. In the downlink direction (from base station to terminal equipment), two or more base stations send the same signal. Since the base stations use the same frequency, the terminal equipment may receive signalling from more than one transmitter at the same time. The signals from the different base stations are distinguished in the same way as the delay components from the different rake branches. In the uplink direction (from terminal equipment to base station), two or more base stations receive the same signal sent by the terminal equipment. The signals are combined in the first common point on the signal path. The soft handoff allows optimal power adjustment, which minimizes the interference level of the network and thereby maximizes the capacity of the network.

The performance of CDMA, which can be measured with spectrum efficiency, has been further improved by sectoring. A cell is divided into sectors of a desired size, and the sectors are served by directional antennas. The interference caused by the mobile stations to one another can then be significantly reduced in the base station receiver. The basis of this is that, on the average, interferences are evenly divided between different inlet directions, the number of which can be reduced by sectoring, as stated above. Sectoring can naturally be implemented in both directions of transmission. The capacity advantage brought about by sectoring is proportional to the number of sectors.

In a sectored cell, it is also possible to utilize a specific form of soft handoff called softer handoff, in which a mobile station performs handoff from one sector to another, communicating with both sectors at the same time. Soft handoff improves the quality of the connection.

Since the capacity of the CDMA is directly linked with the sensitivity of the receiver, the advantage achieved by any diversity method whatsoever will improve the overall capacity of the system. In addition to the above-described soft handoff, i.e. macro diversity, other diversity methods, such as place and time diversity, can naturally also be applied in connection with CDMA.

The present invention particularly concerns a structure of a base station receiver that optimizes the implementation of softer handoff. Prior art with respect to the structure of base station receivers is described in *IEEE Personal Communications,* Third quarter 1994, p. 28–34: 'Reverse Link Performance of IS-95 Based Cellular Systems' by R. Padovani, which is incorporated herein by reference.

FIG. 1 illustrates a diversity receiver according to the prior art, the receiver serving, by way of an example, three sectors. In each sector, antenna diversity, i.e. two reception antennas, is used. Antennas 122, 124 serve the first sector, and antennas 126, 128 and 130, 132 serve the second and third sector, respectively. The receiver comprises a plural number of radio frequency units 100–110. Each antenna is connected to its own radio frequency unit, which converts the signal to an intermediate frequency and to digital form. The digital samples are transferred by means of an RX bus 120 to digital receiver units 114–118. The receiver further comprises a control processor 112, which controls the operation of the other components. To each receiver unit are guided the signals of one user, the signals optionally being received with various antennas or even from different sectors, where softer handoff is concerned. Bus 120 must thus be multiplexed so that the samples from different radio frequency units can be guided to correct reception units.

FIG. 2 illustrates the structure of a digital reception unit 114 of a diversity receiver according to the prior art. Each unit comprises demultiplexing means 200 that receive the desired samples and transfer them to demodulation means 202–206, each of which follows and demodulates one desired signal component. In the demodulation means, the spectrum is assembled by correlating a received signal with a spreading code, whereby the sample rate of the signal will be dropped by a spreading ratio. The thus assembled signal will then be demodulated. In IS-95, for example, uplink demodulation means a Walsh-Hadamard transformer in which the orthogonal signalling used is decoded, i.e. the signal that correlates the most with the input signal is selected. The unit further comprises searcher means 208, which follow and search for preferred signal components. The outputs of the demodulation means are supplied to a combiner 210, which combines the different signal components in an advantageous manner. A combined signal is supplied further to decoding means 212. The unit further comprises a control processor 214, which controls the operation of the other components.

In the solution of the prior art, a central problem is how to implement bus 120. In a base station according to EIA/TIA IS-95, for example, the sampling frequency, at which samples are taken in means 100–110, may be four- or eight-fold as compared with the chip rate (1.2288 Mchips/s) of the spreading code, i.e. $4.9152*10^6$ or $9.8304*10^6$ samples/s. Depending on the situation, the signal dynamics requires, for example, a 4 to 8 bit sample resolution, from which it follows that the total bit rate per one radio frequency unit is, at worst, up to 78.6432 Mbps (8-fold sample rate with an 8 bit resolution) and, at best, 19.6608 Mbps (4-fold sample rate with 4 bit resolution). These figures must be multiplied by the number of radio frequency units 110—110 connected to bus 120. Consequently, implementation of bus 120 is very expensive and technically demanding.

Summary of the invention

An object of the present invention is to provide a base station in which the problems of the prior art can be avoided. The object is thus to provide a base station in which an expensive, high-capacity bus is not needed.

A further object of the invention is to provide a method that facilitates the use of diversity in connection with softer handoff.

The advantages of the invention are achieved with a base station receiver of the invention used in a spread spectrum system in which the service area of the base station is divided into one or more sectors, the receiver comprising a plural number of radio frequency units for each sector and a plural number of demodulation and spectrum disassembling means connected to radio frequency units by means of a bus, and a plural number of detection and decoding means common to all the sectors, the detection and decoding means being connected to the demodulation and spectrum disassembling means of the different sectors by connecting means.

Further, the advantages of the invention are achieved by a method for receiving a signal in a base station receiver of a spread spectrum system in which the service area of the base station is divided into one or more sectors, the signal comprising multipath propagated signal components, and in the method, the signal components received with one or more antennas are converted in each sector to an intermediate frequency and to digital form, the digitalized signal components are supplied by means of a sector-specific multiplexed bus to a plural number of demodulation and spectrum disassembling means, in which each signal component is demodulated and assembled to narrowband form, and the demodulated signal components are supplied by connecting means to a plural number of receiver-specific combining means, in which the signal components are combined and detected.

The solution provided by the invention has several advantages. With the solution of the invention, no high-capacity bus is needed in the base station. Also, when several rake branches are used, diversity gain will improve with handoff between the sectors.

Structural optimization of a receiver concerns the relation of the complexity and price of the equipment to the performance. The solution of the invention is simpler to implement than the prior art solutions, and yet the performance is as good as and in some cases even better than before.

In the basic solution provided by the invention, the rake element is an independent unit and it is separate from a channel unit to which it is connected by connecting means. Preferably, the connecting means can be implemented by a cross-connection matrix or a multiplexed bus. Since the bus is here located after the rake branches, it need not be a high-capacity bus. The sample rate on the bus will be dropped in the solution of the invention by a spreading ratio, i.e. the data rate on the bus is essentially smaller than in the prior art solutions. In the solution provided by the invention, the high-capacity bus that earlier led from the radio frequency parts to a channel unit is limited to run between one pair of radio frequency units and a rake branch, in which position its capacity demand is essentially smaller than before.

BRIEF DESCRIPTION OF THE DRAWINGS

In the following the invention will be described in greater detail with reference to the examples illustrated in the attached drawings, in which.

DETAILED DESCRIPTION OF THE PREFERRED EMBODIMENTS

Figure 1:
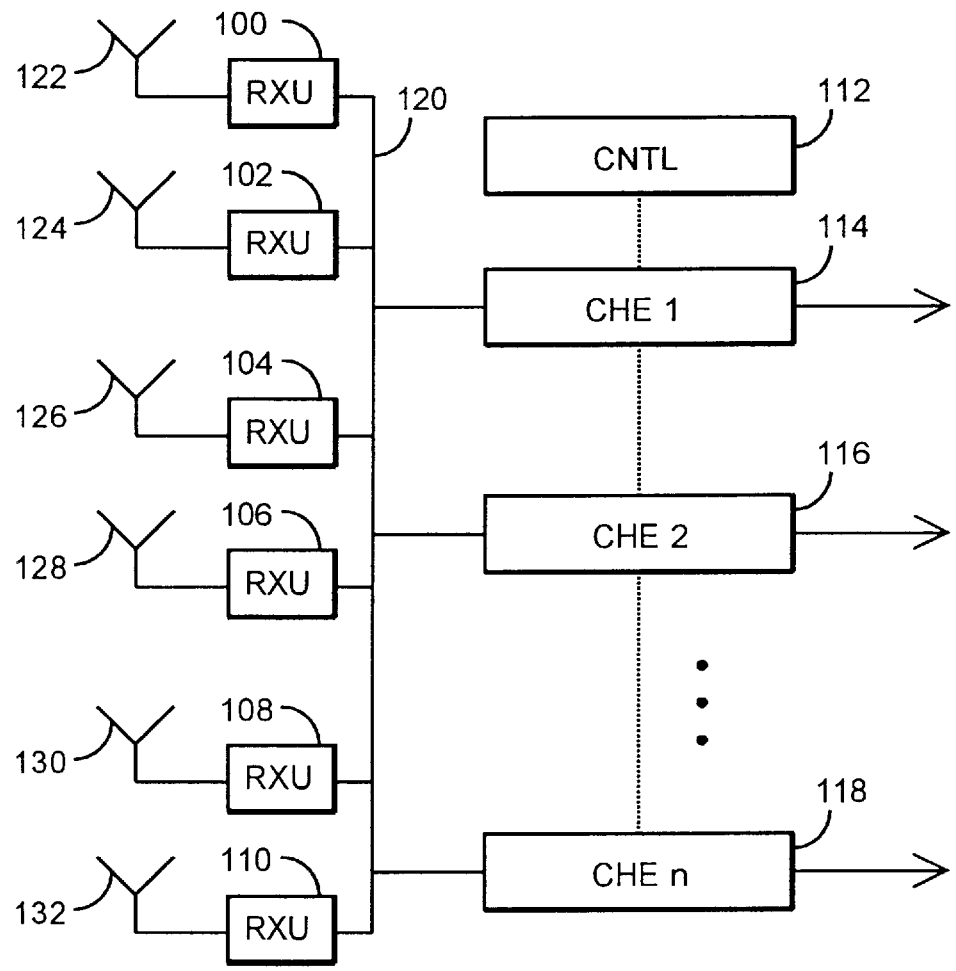
FIG. 1 shows a 3-sector diversity receiver according to the prior art.
Figure 2:
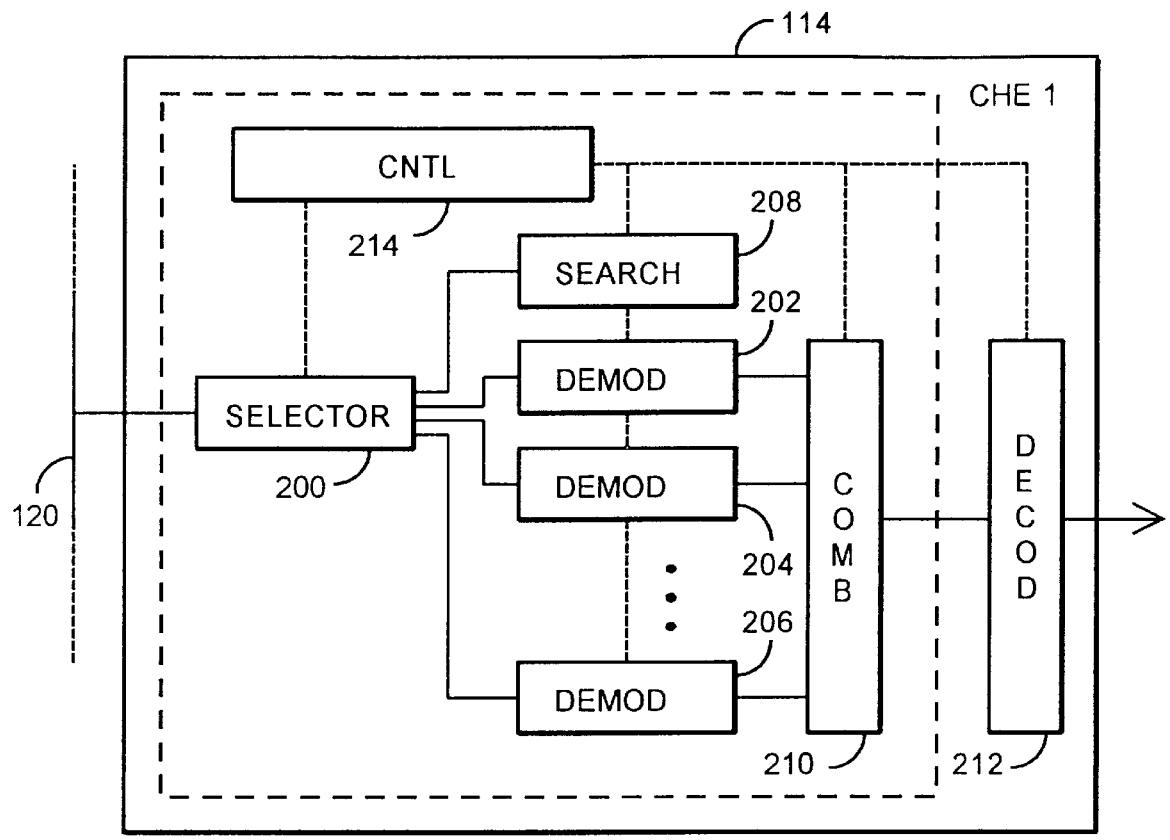
FIG. 2 shows a more detailed view of the structure of a receiver unit according to prior art.
Figure 3:
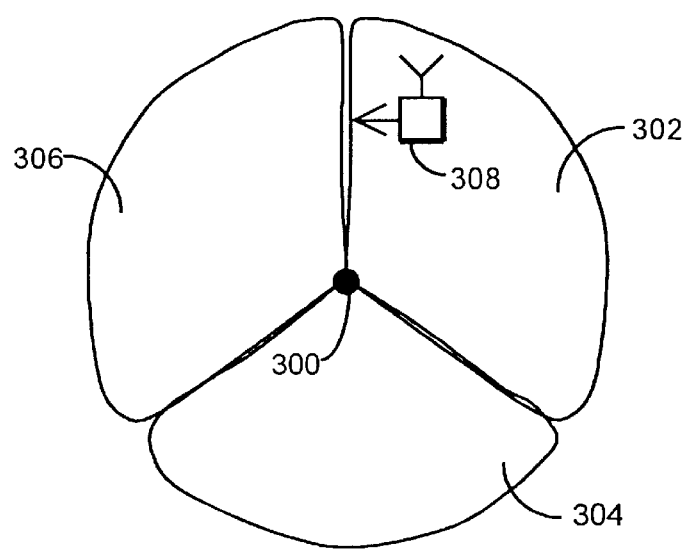
FIG. 3 shows a sectored cell.

We shall first discuss an example of a sectored cell shown in FIG. 3. The figure shows a base station 300 having a coverage range that is divided into three sectors 302–306. Each sector is served by its own radio frequency units. Let us assume that a subscriber equipment 308 is located within the area of a base station 300. The subscriber equipment is in the area of sector 302, but as it moves, it draws nearer to the edge of sector 302 and gradually transfers to the area of sector 306. Upon moving to another sector, the subscriber equipment must perform handoff between the different sectors, such handoff being generally called softer handoff.

Figure 4:
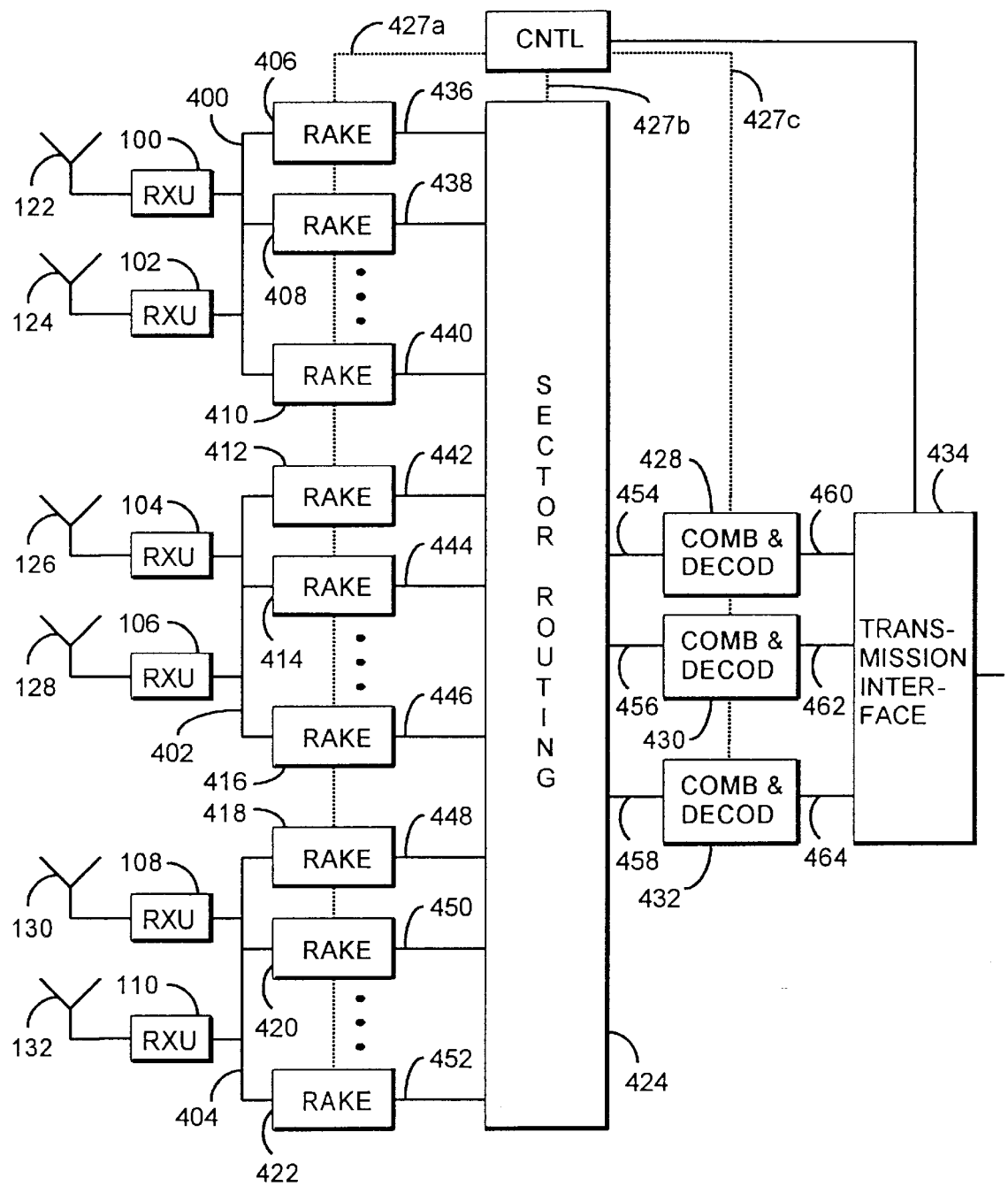
FIG. 4 shows an example of the structure of a receiver according to the invention.

FIG. 4 is a block diagram illustrating the structure of a base station receiver according to the invention. The base station shown in the figure serves a 3-sector cell shown in FIG. 3. In each sector, antenna diversity, i.e. two reception antennas, is used. The exemplary receiver of FIG. 4 thus comprises six antennas. Antennas 122, 124 serve the first sector, and antennas 126, 128 and 130, 132, respectively, serve the second and third sectors. The receiver further comprises a plural number of radio frequency units 100–110. Each antenna is connected to a separate radio frequency unit, which converts the signal to an intermediate frequency and to digital form.

In a receiver provided by the invention, the radio frequency units of each sector are connected via an RX bus to a plural number of sector-specific correlation and spectrum assembling elements. In the first sector, radio frequency units 100, 102 are connected by bus 400 to spectrum assembling elements 406–410. In the second sector, radio frequency units 104, 106 are connected by bus 402 to elements 412–416. Further, in the third sector, radio frequency units 108, 110 are connected by bus 404 to elements 418–422. The receiver thus comprises separate, sector-specific rake elements, which in the prior art solutions have been arranged in connection with the channel units. Elements 406–422 perform combination within a sector. The structure of the elements will be discussed below. Thanks to this solution, the maximum data rate needed on each sector-specific RX bus 400–404 is determined by the number, typically one pair, of radio frequency units in each sector, and so the data rate of the bus does not change as the number of sectors grows.

The receiver further comprises separate combining and decoding means 428–432, which are common to the sectors, and connecting means 424, with which the outputs 436–452 of the elements 406–422 are supplied to the inputs 454–458 of the combining and decoding means 428–432. The combining and decoding means 428–432 are responsible for macro diversity combination (in which the signals to be combined are from more than one element, such as handoff within a sector), detection of signals and decoding. The structure of the combining and decoding means 428–432 will be discussed in greater detail below.

The connecting means 424 thus supply the output signals 436–452 of the elements to the combining and decoding means. With the connecting means, the output of the element can be connected to the input 454–458 of any combining and decoding means 428–432. The data rate of the output signal 436–452 of elements 406–422 is essentially smaller than the output signal of radio frequency units 100–110. The sample rate on the bus will drop in the solution of the invention by a spreading ratio. The implementation of the connecting means is thus easier than that of the RX bus of a conventional receiver. In a receiver according to the invention, the connecting means can be implemented in an advantageous manner, e.g. by means of a cross-connection matrix or a multiplexed bus. The output signals 460–464 of the combining and decoding means 428–432 are supplied to a transmission line adapter 434, from which the signals are supplied further to the other parts of the receiver. The receiver further comprises a control processor 426, which controls the operation of the different parts of the receiver, e.g. the operation of the connecting means 424, by means of control lines 427a–427c. The receiver of the invention naturally also comprises other components, such as filters, as is obvious to a person skilled in the art, but since these components are irrelevant to the invention, they are not shown in FIG. 4.

In the method provided by the invention, a base station receiver sectored for reception of a signal thus receives a signal that comprises multipath propagated signal components. In each sector 302–306, signal components received with one or more antennas are converted to an intermediate frequency and to digital form in radio frequency units 100–110. The digitalized signal components are supplied by a sector-specific multiplexed bus 400–404 to a plural number of demodulation and spectrum disassembling means 406–422, in which each signal component is demodulated and assembled to narrowband form.

Demodulated signal components 436–452 are supplied by connecting means 424 to a plural number of receiver-specific combining means 428–432, in which the signal components are combined and detected.

Figure 5:
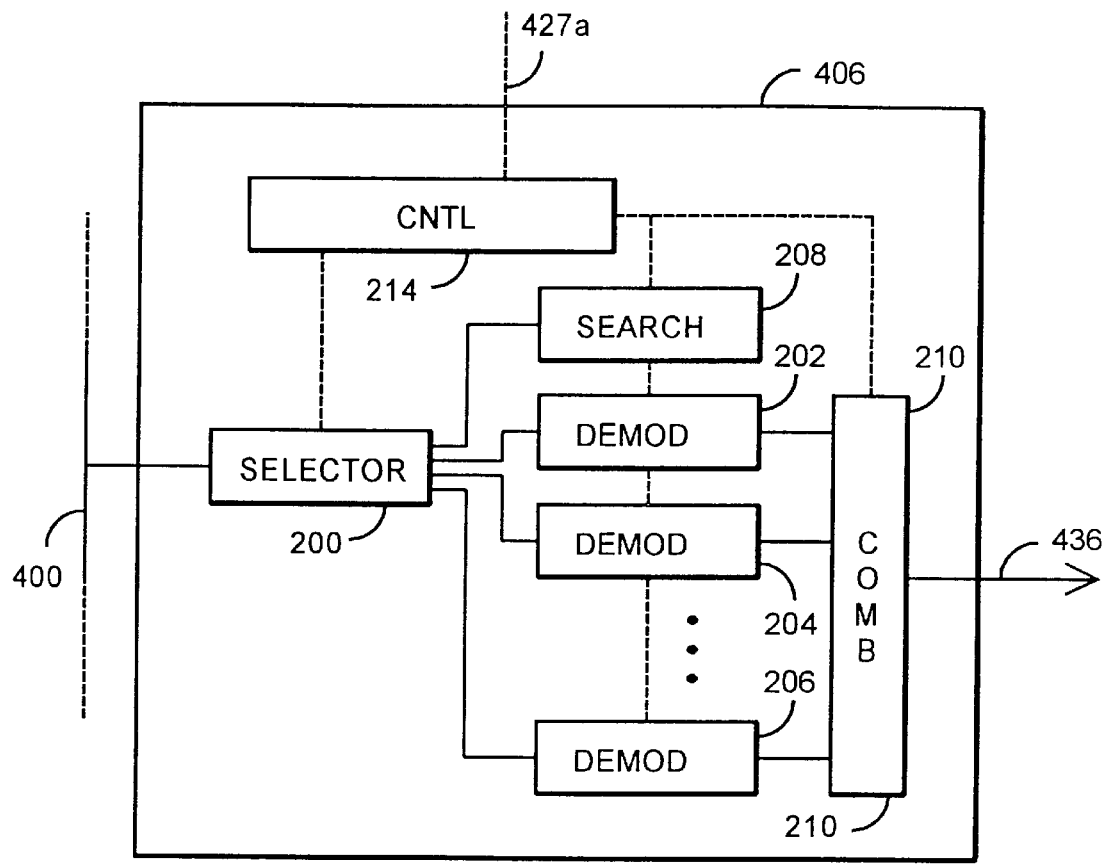
FIG. 5 shows an example of the structure of a rake element.

Let us now study in greater detail an exemplary structure of a spectrum assembling element 406 with reference to the block diagram shown in FIG. 5. From a channel unit according to the prior art, the element comprises the components up to signal combination. The input of the element is a signal of the RX bus 400, the signal comprising the outputs of the radio frequency units of the sector in multiplexed form. The element comprises demultiplexing means 200, which receive the desired samples and transfer them to demodulation means 202–206, each of which follows and demodulates a desired signal component. In the demodulation means, the spectrum is assembled by correlating a received signal with a spreading code, whereby the sample rate of the signal is dropped by a spreading ratio. The assembled signal is then demodulated. In IS-95 system, for example, uplink demodulation means that the orthogonal signalling used is decoded in a Walsh-Hadamard transformer WHT, i.e. a signal that best correlates with the input signal is selected. The WHT narrows the band in the ratio 6:64. The selected output of the WHT, i.e. correlation result, also gives quality information about six detected bits. The assembling of an IS-95 spectrum is thus performed by correlating a received signal over four chips to obtain one chip to be supplied to the WHT, and correlating in the WHT over 64 Walsh chips to obtain six detected bits. The unit also comprises a searcher branch 208, which follows and looks for preferred signal components in a received signal. The unit further comprises control means 214, which control the operation of the other components. The control means 214 are typically implemented by a general or signal processor. A control signal 427a is supplied to the control means 214 from the control unit of the entire receiver.

The searcher branch 208 looks for signals multiplied by a given spreading code in a signal received by a given time window and measures their strength. After finding a component that is stronger than a given threshold, it notifies the control unit 214, which commands, where necessary, one of the demodulating branches 202–206 to receive the component found. The outputs of the demodulation means 202–206 are supplied to a combiner 210, which preferably combines the different signal components. Since the input 400 is a signal from the radio frequency units of one sector, the combined signal 436 may comprise signal components received from one sector only.

Figure 6:
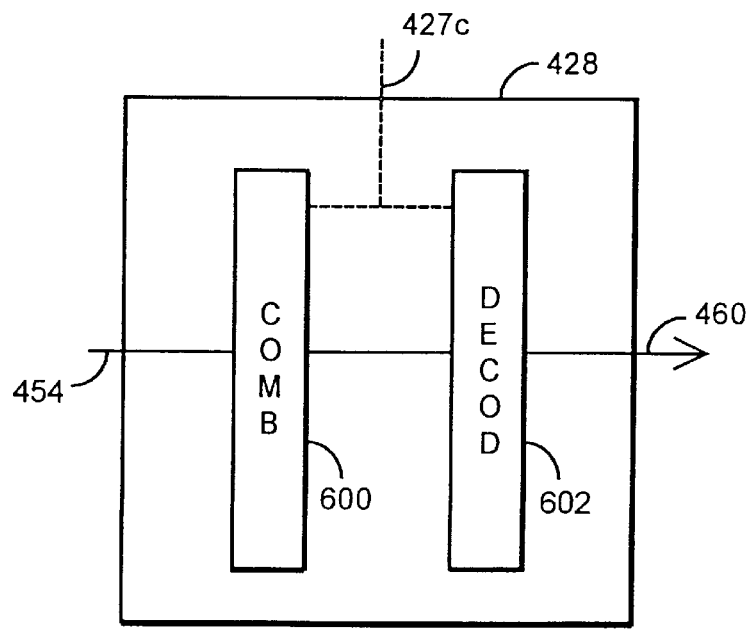
FIG. 6 shows an example of the structure of combining and decoding means.

In the following we shall study in greater detail an exemplary structure of a combining and decoding means 428 with reference to the block diagram of FIG. 6. From a channel unit according to the prior art, the combining and decoding means 428–432 comprise signal combining and decoding parts. The input of the combining and decoding means 428 is thus a signal obtained from the connecting means 424, the signal comprising signal components obtained from elements 406–422 and derived from the same transmitter. Each combining and decoding means thus processes a signal of one user received from one or more sectors. The rake elements used in each particular case may vary, depending on which sector is active at which moment. The signal is first supplied to combining means 600, in which the signals obtained from different sectors are combined preferably by using the combination methods known from the prior art. If the signal is from the same sector, combination is naturally not needed, since combination within a sector has already been performed in the rake element. It is also possible to compute quality information about the signal of each sector to optimize later combination of signals.

A combined signal is supplied to decoding means 602, in which the signal is decoded and detected by known detection methods, and from which the signal 460 is further supplied to the other parts of the receiver. The combining and decoding means 600–602 can both be implemented by the known methods using a signal or general processor or separate components.

Although the invention is described above with reference to the example illustrated in the attached drawings, it is to be understood that the invention is not limited to that particular example but can be modified in many ways within the scope of the inventive idea presented in the attached claims.

We claim:

1. A base station receiver in a spread spectrum system in which a base station has a service area which is divided into a plurality of sectors, the receiver comprising:

a plurality of radio frequency units constituting a respective set thereof for each said sectors;

for each said set a plurality of correlation and spectrum assembling means connected to the radio frequency units of the respective set by a respective bus;

a plurality of detecting and decoding means common to all the sectors; and connecting means connecting said detecting and decoding means to respective ones of said correlation and spectrum assembling means.

2. A base station receiver in a spread spectrum system in which a base station has a service area which is divided into a plurality of sectors, comprising:

each sector being served by a respective set of one or more radio frequency units that comprise means for converting a signal received by a respective antenna to a respective intermediate-frequency signal;

means for sampling and converting said intermediate-frequency signal to digital form as a respective digitalized signal, and in which a plurality of sector-specific buses for supplying each said digitalized signal from each respective said unit to a plurality of sector-specific correlation and spectrum assembling means; and connecting means connecting each correlation and spectrum assembling means to a plurality of detection and decoding means common to all of said sectors.

3. A base station receiver according to claim 1, in which the connecting means are implemented by means of a cross-connection matrix.

4. A base station receiver according to claim 1, in which the connecting means are implemented by means of a multiplexed bus.

5. A base station receiver according to claim 2, further comprising:

control means arranged to guide, by said connecting means, signal components that have been received, all from a same transmitter, by the respective said radio frequency units o the respective said sectors, to a respective said detection and decoding means.

6. A method for receiving a signal in a base station receiver of a spread spectrum system in which a base station has a service area which is divided into a plurality of sectors, the signal including multipath propagated signal components, the method comprising the steps of:

converting the signal components received by at least one antenna in each sector to a respective intermediate frequency, and to digital form, as respective digitalized signal components;

supplying said digitalized signal components by a sector-specific multiplexed bus to a plurality of correlation and spectrum assembling elements and, in said elements demodulating each said digitalized signal component to demodulated signal components and assembling said demodulated signal components to narrowband form; and supplying said demodulated signal components, by connectors, to a plurality of receiver-specific combiners, in respective ones of said combiners, combining and detecting the signal components obtained from the respective said sectors.

7. A method according to claim 6, in which:

said supplying includes supplying said demodulated signal components by a cross-connection matrix to a plurality of said receiver-specific combiners.

8. A method according to claim 6, in which:

said supplying includes supplying said demodulated signal components by a multiplexed bus to a plurality of said receiver-specific combiners.

9. A method according to claim 6, in which:

in said combining and detecting, each said receiver-specific combiner processes signal components received from a same transmitter.

10. A base station receiver according to claim 2, in which the connecting means are implemented by means of a cross-connection matrix.

11. A base station receiver according to claim 2, in which the connecting means are implemented by means of a multiplexed bus.

* * * * *